United States Patent [19]

Shuto

[11] Patent Number: 5,349,477

[45] Date of Patent: Sep. 20, 1994

[54] SYSTEM FOR RECORDING FROM LIVE SOURCE OR DUBBING TO MULTIPLE TAPES

[75] Inventor: Kenji Shuto, Tokyo, Japan

[73] Assignee: Mothers System U.S.A., Inc., New York, N.Y.

[21] Appl. No.: 904,077

[22] Filed: Jun. 25, 1992

[51] Int. Cl.[5] ............................................... G11B 5/86
[52] U.S. Cl. .......................................... 360/15; 360/13; 369/84
[58] Field of Search ................ 360/15, 74.5, 74.6, 360/74.7, 13, 14.1, 14.2, 74.1; 369/1, 84

[56] References Cited

U.S. PATENT DOCUMENTS

| | | | |
|---|---|---|---|
| 3,519,762 | 7/1970 | Morris | 360/15 |
| 3,767,206 | 10/1973 | Rehklau et al. | 360/15 |
| 4,122,500 | 10/1978 | Bradford et al. | 360/13 |
| 4,543,618 | 9/1985 | Sato | 360/15 |
| 4,628,370 | 12/1986 | Fukuoka | 360/15 |
| 4,792,867 | 12/1988 | Komori | 360/15 |
| 4,864,431 | 9/1989 | Murase | 360/15 |
| 5,117,317 | 5/1992 | Suzuki | 360/74.6 |
| 5,124,807 | 6/1992 | Dunlap et al. | 360/15 |

Primary Examiner—Edward P. Westin
Assistant Examiner—Jon Santamauro
Attorney, Agent, or Firm—Lowe, Price, LeBlanc & Becker

[57] ABSTRACT

A system for making multiple duplicates of live program material or dubbing from a master cassette comprises a central control panel for operating a master deck and simultaneously controlling a plurality of slave decks. Operation of the system selectively in live performance recording and dubbing modes of operation is controlled from separate switches at the control panel while override circuitry prevents recording on the master if live performance recording and dubbing operation switches are operated simultaneously. Each deck includes a pivotable cassette lid and a pack switch responsive to the lid to control the corresponding deck independently of the others enabling recording from live programming to be staggered in time among multiple cassettes. During dubbing, when both the master and slave decks are to be operated, the master deck is delayed upon start-up for a duration sufficient to compensate for the nonrecordable leader portion of the slave cassette.

15 Claims, 8 Drawing Sheets

SYSTEM FOR RECORDING FROM LIVE SOURCE OR DUBBING TO MULTIPLE TAPES

TECHNICAL FIELD

This invention relates generally to making multiple tape copies of program material simultaneously. The invention is particularly applicable to controlling systems for recording from a live performance or dubbing to multiple tape cassettes.

BACKGROUND ART

Conventional duplicators are capable of making multiple tape copies of program material derived from a master (this technique is known as "dubbing"). The duplicator comprises a main deck for a master recording and a number of slave decks into which multiple recording media, such as cassettes, are placed. Programming reproduced from the master is recorded on all the slaves simultaneously. Various controls enable audio or video programming copied from the master to be tailored for reproduction on the slaves.

The art of dubbing is relatively well developed. Commercial equipment, such as the DP-4050 series of cassette-to-cassette copying machines by Otari Corporation of Belmont, Calif., is capable of making a relatively large number of duplicates from a master by connecting a master and a number of slave units in tandem, each unit carrying ten duplication cassettes. Other examples are found in Rehklau et al. U.S. Pat. No. 3,767,206 and Fukuoka U.S. Pat. No. 4,628,370.

While generally satisfactory for the purposes intended, these and other duplication systems are deficient in certain respects. For example, the recording tape onto which duplicates are made generally has a length of tape leader that is resilient but nonrecordable. On the other hand, the tape used as the master generally has no leader. Accordingly, when the master tape and a number of slaves are loaded in a duplicator, the operator must take precautions to avoid dubbing from the master to the leader portions of the slaves. The operator may advance the slave tapes by manual control to bypass the leaders and then begin dubbing from the master. This procedure can be unacceptably inconvenient when many (up to 100 or more) copies are being made simultaneously.

As another example, duplicators of which we are aware are not capable of making multiple copies of a live performance. The utility of live performance multiple copy duplication equipment can be appreciated from the following. It often is necessary to distribute a large number of duplicates of a program immediately following an event, such as a seminar or concert. In conventional duplication, a good quality master is made from the live performance. After that, multiple duplicates are made by dubbing using commercially available cassette-to-cassette duplication systems of the type previously described. Because a considerable amount of time is required to make a large number of duplicates from the master, it is not possible to distribute the duplicates immediately following the event. Copies are mailed to the attendees or audience following the seminar or concert to fill orders.

To enable program copies to be distributed immediately, duplication equipment must be capable of making a very large number of copies simultaneously. The equipment must be capable of "foolproof operation," as any operator error or equipment failure will prevent the copies from being available for sale or distribution immediately following the event. For example, if the equipment is capable both of dubbing and recording from live performances, a situation can arise where an operator may encounter confusion when controlling the equipment to dub or live record. If the operator inadvertently controls the equipment to carry out live recording to all cassettes while also dubbing from a master, the equipment will record from the microphone on all tapes including the master.

Another deficiency found in duplicators known in the prior art is in lack of ability to record segments of a live performance to individual tapes of a bank of tapes in staggered or random fashion. For example, it may be envisioned that the live performance is a concert given by children where the children give solo performances some of the time and play together other times. Parents may desire to have recordings of the concert when the children play together and portions when their child plays solo but not when other children perform solo. Available equipment is not capable of personalizing recordings in this respect.

DISCLOSURE OF THE INVENTION

Accordingly, one object of the invention is to improve control of systems making multiple tape copies of program material derived from a live performance or master tape.

Another object is to improve control of tape duplication systems having slave decks connected in series for making multiple tape copies.

A more specific object of the invention is to control a dubbing system so as automatically to prevent recording from a master tape to the nonrecordable leader of a slave tape.

Another object is to prevent recording on a master tape by a system capable of carrying out live performance recording and dubbing when recording and dubbing controls are operated simultaneously.

Yet another object of the invention is to enable recording of a live performance to be staggered in time among the tapes of a multiple tape recording system.

These and other objects of the invention are satisfied by an improved system for making multiple tape copies of program material derived from a live performance or master tape. In accordance with one aspect of the invention, a system for copying program signals from a master tape to slave tapes, each slave having a nonrecordable tape leader, comprises master and slave tape drive units, a playback head for reproducing program signals prerecorded on the master tape, and a recording head for recording program signals on each slave. A control panel is responsive to panel selection of a dubbing mode of operation for energizing the master and slave tape drive units and controlling the heads to record program signals read from master tape to the slaves. To prevent recording from the master to the tape leaders of the slaves, a delaying means operates during the dubbing mode to prevent energizing the master drive unit for a duration following start-up of the system sufficient to enable the tape leaders to bypass the recording heads.

In accordance with a second aspect of the invention, the control means is further responsive to panel selection of a live recording mode of operation for energizing the slave drive units and controlling the recording heads to record to the slaves live program signals received from a microphone. The control panel includes a first bank of switches for controlling the system to operate in the dubbing mode and a second bank for the live performance recording mode. To prevent an operator from inadvertently recording on the master, override circuitry coupled to the first and second banks of switches overrides the recording mode of operation when recording mode and dubbing mode panel switches are operated simultaneously.

In accordance with a further aspect of the invention, to enable recording from live programming to be staggered in time among multiple cassettes, each cassette deck includes a lid pivotable open and closed. A pack switch coupled to each lid controls the corresponding drive unit to start or stop independently of the other units.

As a further aspect of the invention, central control signals generated by a main modular unit are supplied to a number of modular sub-units connected in series. To enable downstream sub-units to respond reliably to central control despite signal degradation, the control signals are amplified and conditioned at each sub-unit.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BEST MODE FOR CARRYING OUT THE INVENTION

Figure 1:
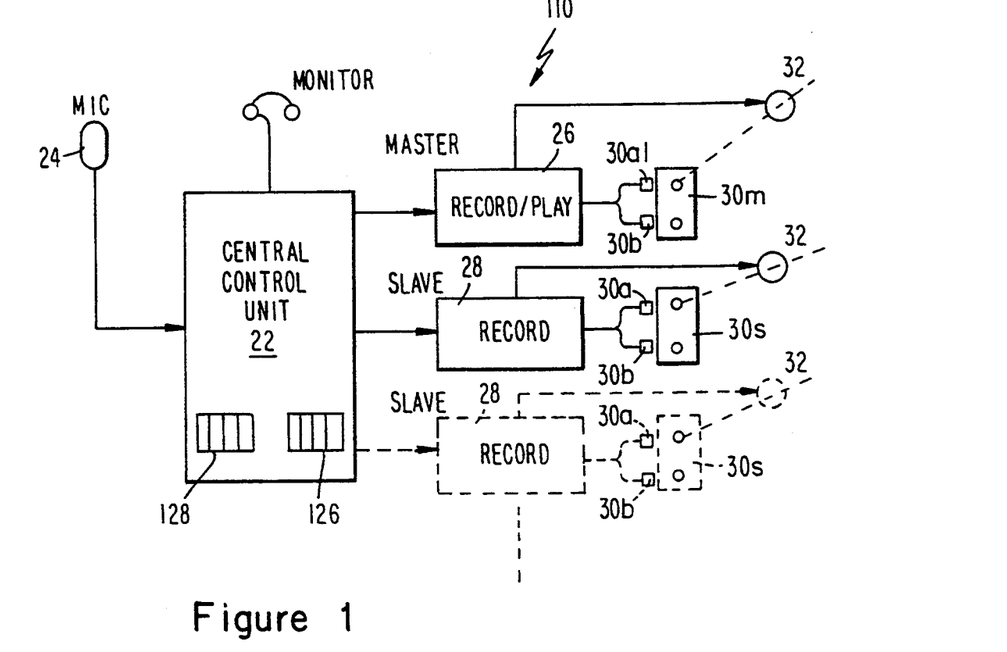
FIG. 1 is a general system block diagram of the main unit of a recording system in accordance with a preferred embodiment of the invention.

A recording system, in accordance with the preferred embodiment of the invention, comprises an arrangement of series-connected modular units capable of making a large number of duplicate cassette recordings of programming derived from a live performance or dubbed from a master cassette. Referring to FIG. 1, a main unit 110 contains a number of cassette decks 30, one deck 30m being designated as a "master" deck and the others 30s being designated as "slaves." The master and slave decks are controlled commonly by a central control 22 connected to receive audio signals from an external source, such as a microphone 24, or to dub audio signals from a master deck within the unit.

Figure 2:
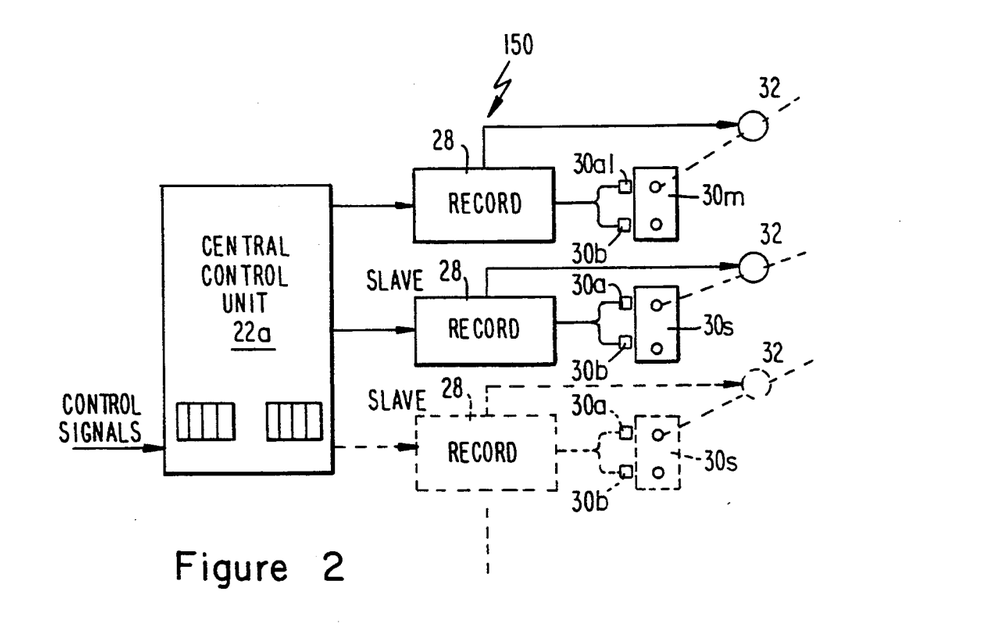
FIG. 2 is a block diagram of a sub-unit of the system in accordance with the invention.
Figure 3:
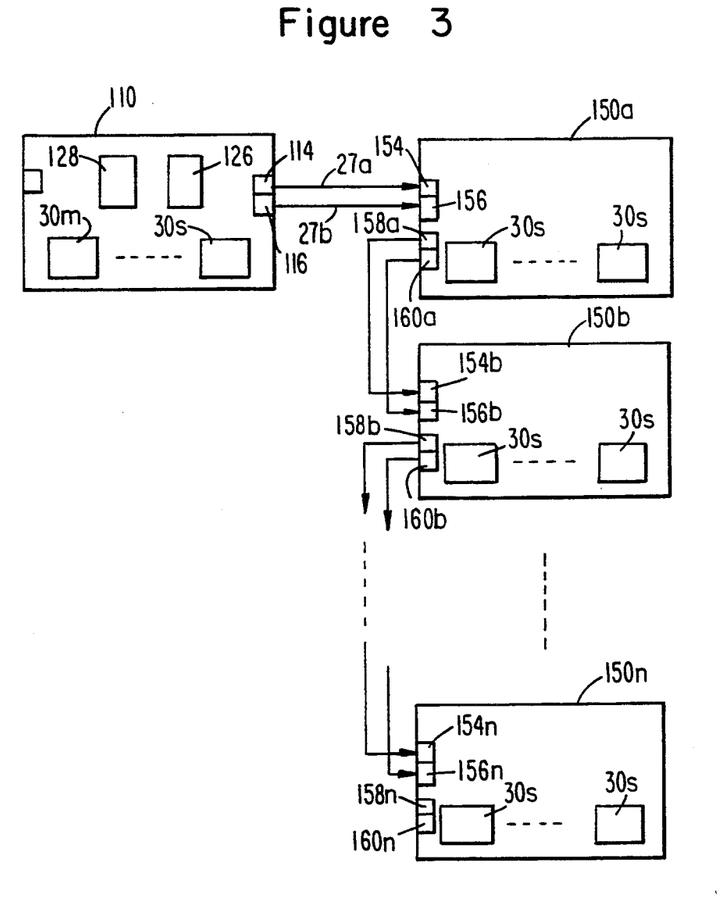
FIG. 3 is a system block diagram showing a master unit and multiple sub-units of the invention connected in series.

The central control 22 of the main unit 110 supplies control signals to a number of sub-units 150 of FIG. 2, connected in series with each other and with the main unit 110, as shown in FIG. 3. Each sub-unit 150 contains a number of slave decks 30s. Audio and control signals are transferred along lines 27a,b from the central control 22 of main unit 110 to the controls 22a of the series of sub-units 150. By transferring control signals to the central control units 22a of all the sub-units 150, the control 22 of the main unit 110 centrally controls the functions of all the decks of the main unit and of every sub-unit.

The main unit 110 and sub-units 150 accommodate playback and recording media in the form of audio cassettes in the preferred embodiment. However, the recording medium may be in the form of disks, semiconductor memories, printed matter or the like, and the signals played back and recorded may be audio signals, video signals, or data in the form of analog or digital signals.

Each unit 110, 150 includes a number of circuits 26, 28 that control recording and playback of audio signals to and from cassettes through tape heads 30a, 30b. In the preferred embodiment, head 30a performs the combined functions of record and playback, and head 30b is an erase head. Alternatively, the three functions, record, playback and erase may be performed by different combinations of heads or by three separate heads. Each circuit 26, 28 furthermore develops a signal to energize a deck drive 32 coupled to a drive spindle for a cassette. Alternatively, a single drive and spindle may be shared among the cassettes.

Circuit 26, providing control signals both for the record and playback functions, is associated with only the master deck 30m of the main unit 110 of FIG. 1. The circuits 28, generating control signals for the record function, are associated only with the slave decks 30s to which the copies are made. The slave decks 30s constitute all but one of the decks of the main unit 110 and all the decks of all the sub-units 150.

The central control 22 of master unit 110 has, in addition to a microphone input Jack, an output terminal for a monitor in the form of a speaker or headphone set, and switch banks 126 and 128 for controlling recording and dubbing functions. The control 22 generates suitable audio and control signals to record programming on all the decks for recording and to playback from only the master deck 30m for dubbing.

The corresponding central control 22a of each sub-unit 150 relays the audio and control signals on lines 27a,b to the slave decks 30s of the sub-units 150. The central control units 22a of the sub-units 150 do not have microphone or speaker terminals since input and monitoring are carried out only at the main unit 110.

Figure 4:
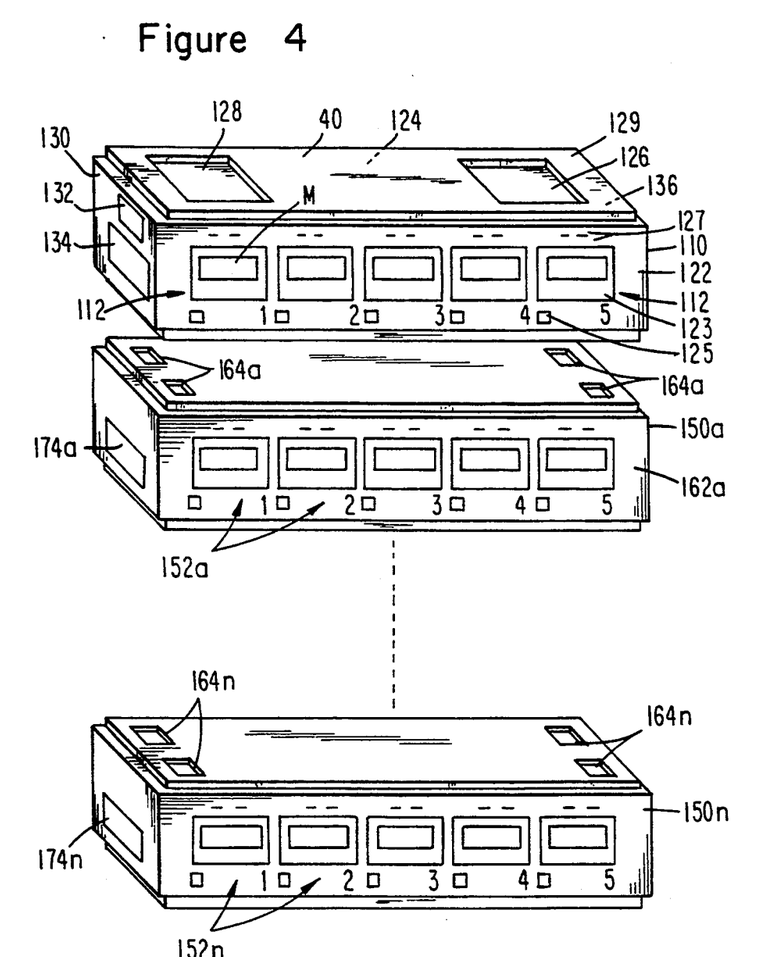
FIG. 4 is an exploded view showing stacking of a main unit and several sub-units.

The physical layout of main and sub-units 110, 150 comprising the system of this invention is shown in FIG. 4. Each unit is encased by a cabinet 40 housing ten cassette decks (five on each side) capable of receiving a cassette. The master cassette deck 30m preferably is located at one end of the series of decks on the master unit 110, identified by the letter M.

The top of the cabinet of only the main unit 110 contains two banks of control switches 126 and 128, one bank 126 for live recording and the other 128 for dubbing. Switches on the cabinets of the sub-units 150 are not required, as all units are controlled commonly from the main unit 110.

If the "record" switch of panel 126 is operated, all ten decks of the main unit and all ten decks of each sub-unit 150 record from the microphone or other external source of programming. If the "dubbing" switch of panel 128 is operated, the master deck 30m is controlled to operate in playback while all the slave decks 30s record to make copies of programming recorded on the master.

Assuming that ten cassettes are loaded in the main unit 110, it is possible to make ten copies of a live performance, or nine copies dubbed from a master. By connecting the modular units in series, as shown in FIG. 3, any number of copies can be made simultaneously. With ten cassettes loaded in each sub-unit 150, and assuming for this example that nine sub-units and a main unit are connected in series, the system of FIG. 3 is capable of making 100 simultaneous copies of a live performance or of dubbing 99 copies from a master. As a practical matter, any number of additional sub-units may be appended, representing the capability, immediately following an event, to make available a number of copies sufficient to satisfy virtually any requirement.

Figure 5:
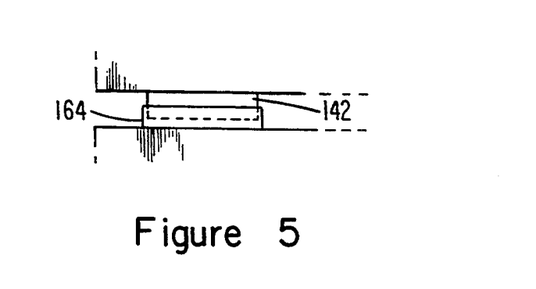
FIG. 5 is a detail showing mechanical coupling of two units of FIG. 4.
Figure 6:
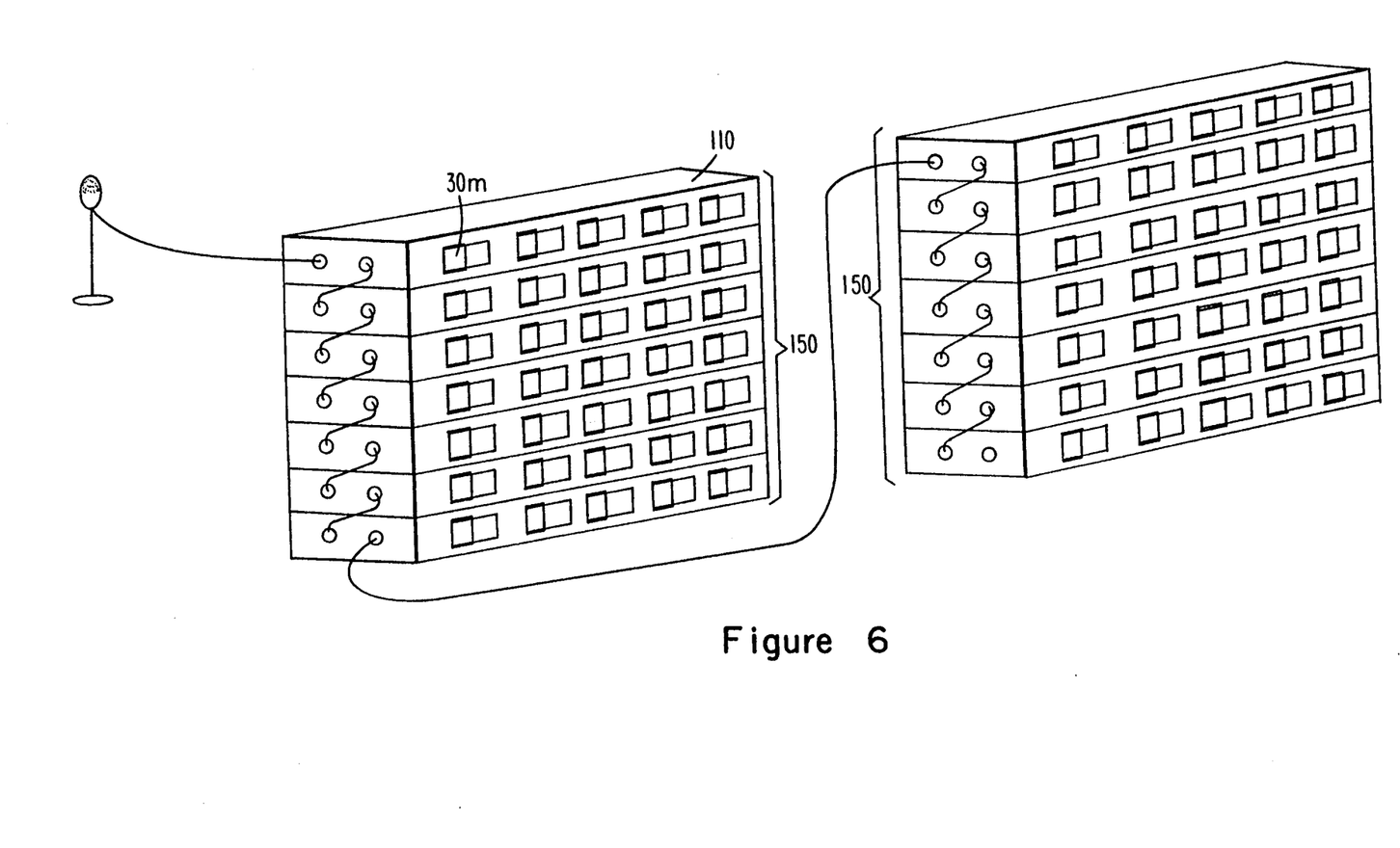
FIG. 6 is a perspective view showing multiple recorder units electrically interconnected and arranged in two stacks.

FIG. 6 depicts a stacked arrangement of recording units coupled together through corner connectors 142, 164 shown in FIG. 5. The system shown comprises one master unit monitoring a live performance through a microphone and thirteen slave units connected in series, for a total of 140 decks including the master deck. Additional stacks of slave units may be added to the system of FIG. 6 to accommodate the requirements of a public concert or other application that necessitates a very large number simultaneous copies.

The uppermost unit of a stack will be the main unit; all the others are sub-units. In the embodiment of FIGS. 4 and 6, each unit, having ten decks in total, is arranged with five decks 112 at the front 122 and five decks 112 (not shown) at the back 124. Each deck includes a cassette holder 123, an eject button 125 under the cassette holder 123, and an LED 127 for indicating the tape running directions.

Figure 8:
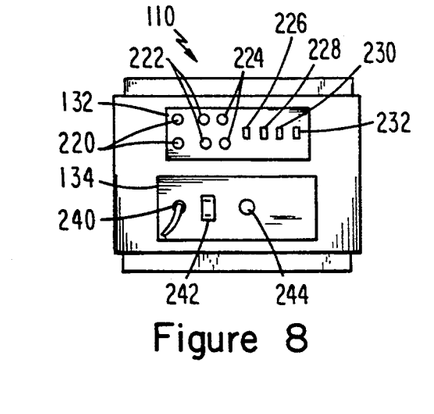
FIG. 8 is a detailed side view of the main unit shown in FIG. 4.
Figure 9:
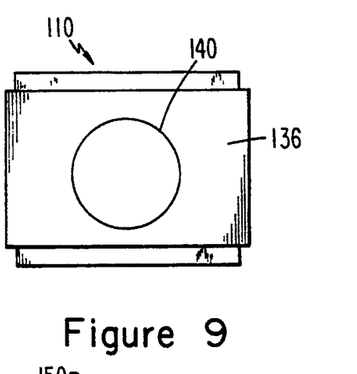
FIG. 9 is an opposite side view of the main unit.

The left hand side 130 of the master deck unit 110 includes input/output terminal panels 132 and 134, shown in detail in FIG. 8. A monitor speaker 140, shown in FIG. 9, is provided at the right hand side of the main unit.

Each of the sub-deck units 150a–150n on which the main unit 110 is placed includes, like the main unit, ten decks 152a–152n in total, five at the front and the other five at the back. On the top of each sub-deck unit are the receptacles 164a–164n for receiving the legs of the main unit or a sub-unit for stacking. Also, the left hand sides of the sub-deck units include input/output terminal panels 174a–174n, shown in FIG. 10, which is similar to the terminal panel 134 of the main deck unit 110.

Figure 7:
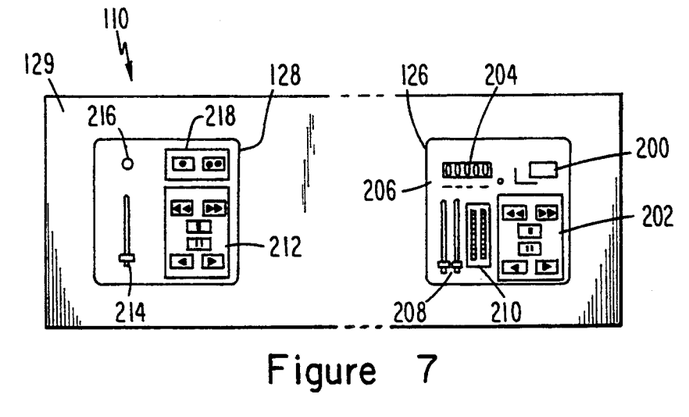
FIG. 7 is a top view of the control panel of a main recording unit, with switches arranged in first and second banks.

Referring to FIG. 7, the recording operation panel 126 of main deck unit 110 includes a power switch 200, a recording operation button array 202 (including a front side record button, a reverse side record button, a pause button, a rightward fast forward button, a leftward fast forward button and a stop button), a recording time indicator, four indicators 206 indicating the status of four switches 226, 228, 230 and 232 disposed on one side as shown in FIG. 8, a recording level volume control 208 and a recording level indicator 210.

The dubbing operation panel 128, provided exclusively for the master deck of the main unit 110, includes a playback button array 212 (including a front side playback button, a reverse side playback button, a pause button, a rightward fast forward button, a leftward fast forward button and a stop button), a monitor level volume 214, a headphone jack 216 and a set of copy speed selector buttons used to select the speed (normal or high) and to copy the contents of the tape inserted into the master deck on the tapes in all the other decks (slaves).

With reference to FIG. 8, the upper panel 132 of main deck unit 110 includes the microphone input terminal 220, a line input terminal 222, a line output terminal 224, a microphone/line select switch 226, a stereo/monaural select switch 228, a talk switch 230 to attenuate low frequency sounds when the microphone input is used, a mode select switch 232 used to select recording on both sides or recording on one side only. The lower panel 134 includes a power cable 240 for this unit, an AC outlet 242 for receiving the plug of the power cable of a sub-unit, and a connector 244 for synchronized operation of a sub-unit with the main unit. The connector 244 is equivalent to the control output terminal 114 and the audio output terminal 116 of FIG. 3.

Figure 10:
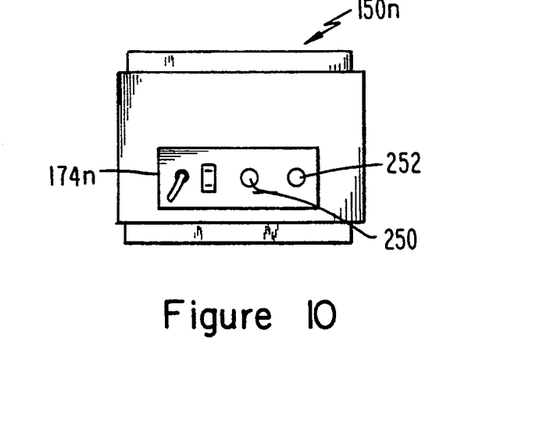
FIG. 10 shows one side of a sub-unit of FIG. 4.

In FIG. 10, the input/output terminal panel 174n of one sub-unit 150n is the same as that of the other sub-units. Panel 174n is provided with two connectors 250 and 252 for synchronized operation. The connector 250 corresponds to terminals 154n and 156n shown in FIG. 3, whereas connector 252 corresponds to terminals 158n and 160n.

A sufficient number of units consisting of the main deck unit 110 and/or the sub-units 150 are provided to obtain the required number of program copies. Connections for the program signals and control signals between the main unit 110 and one sub-unit 150 are made through the connector 244 of the main unit and connector 250 of the sub-unit. Such connections between any two sub-units are made through connector 252 of the upper sub-unit and connector 250 of the lower sub-unit. Connections to the power supplies of the sub-units are made by using the AC outlets 242 of the main unit and the sub-units.

If an external source is used to derive live performance programming signals through a microphone, the microphone input terminals 220 of the main unit 110 are employed. Line input terminals 222 are employed when a line such as a mixer is used as the source of a program. When recording from an external source as above, control of recording two tapes loaded in the decks is accomplished by using the recording operation panel 126.

On the other hand, when an internal source is used, that is, when a master tape loaded in the master deck of the main unit 110 is used as the source of a program (dubbing operation) the contents of that tape can be copied to tapes loaded in other decks of the main unit and all the decks of any sub-units connected to it in the dubbing mode of operation. At this time, either one of the copy speed select buttons 218 of the playback operation panel 128 is selected. During dubbing, recording is performed at the same level as the recorded level of the master tape being reproduced.

Aspects and features of the invention shall now be described with reference to FIGS. 11–15.

Figure 11:
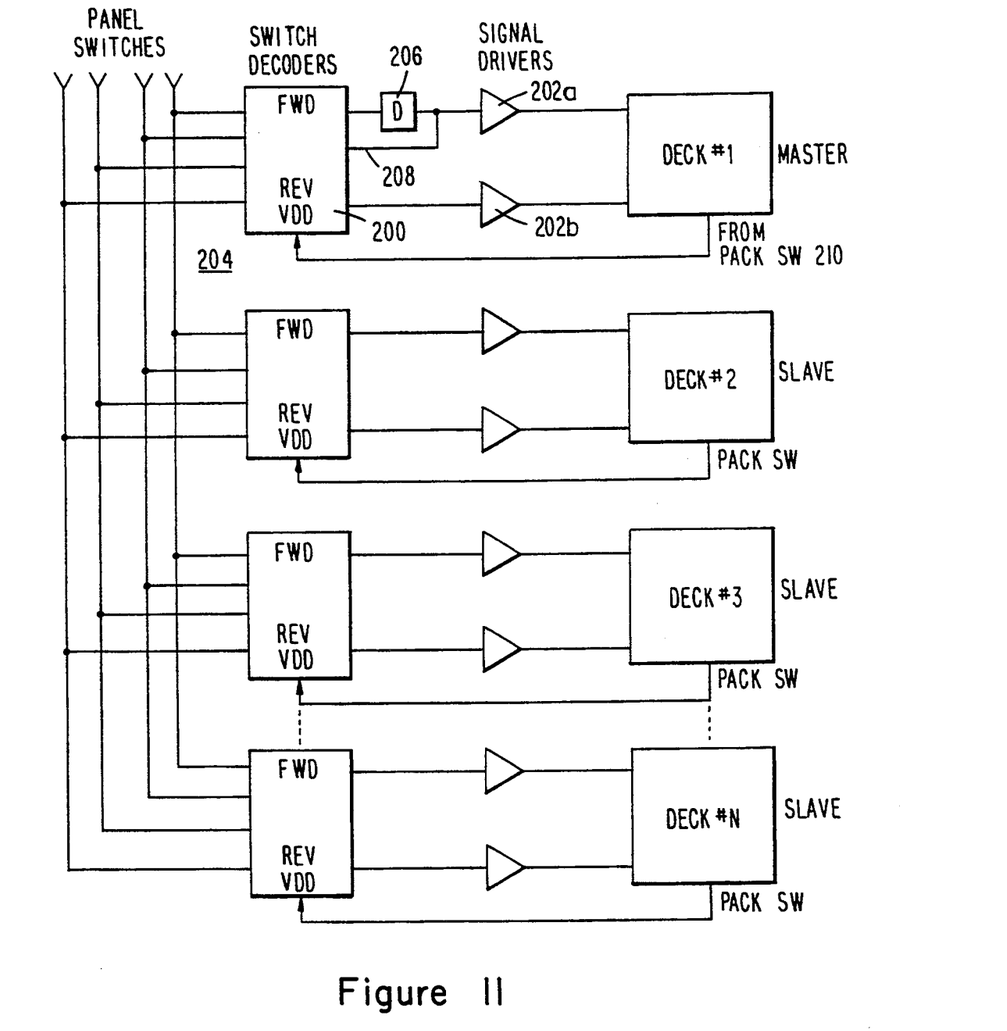
FIG. 11 is a diagram of circuitry for controlling cassette drives such that copying from a master cassette is delayed until the leader portion of the slave cassette has passed its recording head. This Figure also depicts operation of a pack switch coupled to the lid of each cassette deck to enable time staggered recording among cassettes.
Figure 11A:
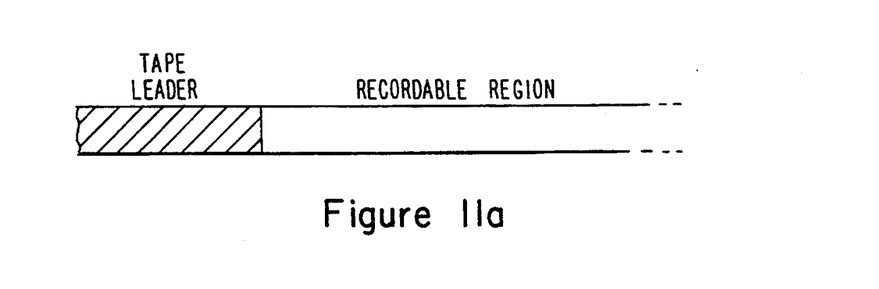
FIG. 11a is a diagram showing a tape and leader for dubbing programming from a master.

Referring to FIG. 11a, the tape of each slave cassette to which programming from a master cassette is to be dubbed contains a tape leader section, several inches in length, that is resilient but nonrecordable. The leader is followed by the recordable region of the tape onto which programming is to be copied. A master tape, however, generally will have no leader. Accordingly, when copies are made from the master, an operator must manually advance the slave tapes until the leader has passed beyond the recording head of the slave deck. As this is inconvenient, particularly when a large number of copies are to be made, an aspect of the invention advances all the slave tapes automatically before dubbing begins, to prevent recording on the leaders.

More particularly, referring to FIG. 11, deck #1, which is one of the ten decks housed by the master unit 110, is driven in forward and reverse directions by control signals developed by the panel switches of unit 110; decoded by a switch decoder 200 and amplified by drivers 202a, 202b. When switch decoder 200 generates a first control signal FWD to drive deck #1 in the forward direction, that signal is amplified by driver 202a and supplied to an electric motor in deck #1 that is mechanically coupled to a tape spindle. Similarly, when decoder 200 generates a second signal REV to drive the deck in the reverse direction, that signal is amplified by driver 202b and supplied to the same or a different electric motor within master deck #1 coupled to the same or the other spindle. The FWD and REV control signals appear on control lines 204 that in turn are connected to the panel control switches of the main unit 110.

Decks #2–N, carrying the slave cassettes onto which copies of the master are to be dubbed, similarly are driven by switch decoders 200, drivers 202a and 202b to drive the slave cassettes in the forward and reverse directions. The drive control circuitry of the master deck 30m differs from those of the slaves 30s by the addition of a delay circuit 206 only in the FWD signal path at the output of the first switch decoder 200 for the master deck. The delay 206 may be comprised, for example, of a conventional resistor-capacitor delay circuit of values appropriate to delay the forward operation of the master deck by a duration sufficient to enable the tape leaders of the slave cassettes to bypass their recording heads during dubbing. In other words, when switch decoders 200, monitoring signals on panel switch lines 204, determine that dubbing is to be carried out, the decoders all generate an FWD control signal to drive all decks forward. However, energization of the forward drive of the master deck 30m is delayed by a duration, e.g., a few seconds, sufficient to compensate for the tape leaders of the slaves. When the switch decoders detect a command to drive all decks in the reverse direction, however, there is no delay.

During live performance recording, when programming is recorded to all the tape decks including the master, the switch decoder 200, sensing the desired mode on panels switch lines 204, bypasses the delay circuit 206 by line 208. Accordingly, recording to the master deck is started in synchronism with all the other decks; there is no delay.

Figure 12:
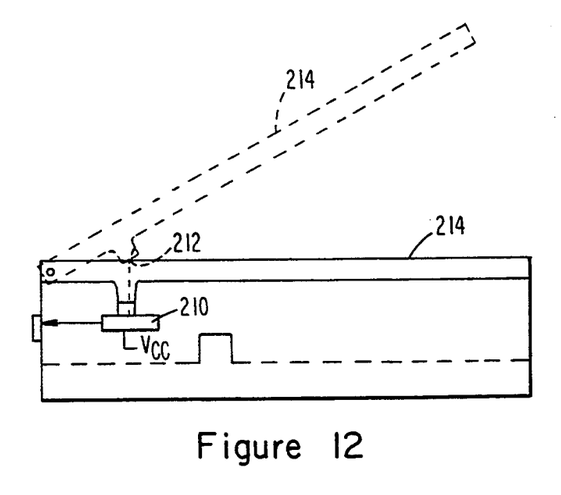
FIG. 12 is a symbolic drawing showing a cassette deck lid and pack switch assembly used in the invention.

Another aspect of the invention enables a novel function termed "staggered recording" to be carried out wherein recording to each deck from a live performance is controlled manually, deck-by-deck, by opening or closing the lid of each deck. Referring to FIG. 12, within each deck is a pack switch 210 positioned to be operated by a tab 212 extending from one side of lid 214. When the lid is in the closed position as shown in solid lines in FIG. 12, the extension 212 is in contact with pack switch 210 to maintain the switch electrically closed. However, when the lid 214 is pivoted open, as shown in dotted lines, the extension 212 moves out of contact with switch 210 and the switch opens.

The pack switch 210 of each cassette deck has one terminal connected to a voltage source and another terminal connected to an output line from the deck. Referring to FIG. 11, the pack switch 210 of each deck supplies operating power to the corresponding switch decoder circuit 200. When the pack switch 210 is closed, operating power is applied to power supply terminal VDD of the decoder to enable the circuit to drive the deck if required by the panel switches. When the pack switch is off because the lid 214 is pivoted open, however, operating power is not supplied to the decoder 200. The corresponding cassette deck is not driven even if the panel switches indicate a recording mode of operation. By manually opening and closing the lid, therefore, the user can selectively record to cassettes in a time staggered or arbitrary sequence.

For example, assume that there is a violin concert for twenty children. The program is as follows. First, all children play together, then each child plays a three minute solo and finally all again play together. The parents want tapes with all twenty children playing together and the solo of their child. They do not want to record the solos of the other children. By operating the panel switches at the master unit, all tapes will begin recording at once. Then, for the solos, each cassette deck lid can be opened and closed individually to record each solo on a different tape. Finally, all tapes are stacked simultaneously by operating a panel switch.

Time staggered recording is carried out as follows. If all cassette deck lids are open except one, that one deck will record when the record switch is operated. If the next deck lid is closed, when the record switch is operated the next deck will record while the first deck continues recording. If the lid of the first deck is opened, that deck will stop recording. If the first and second lids remain closed, upon closure the next deck will begin recording while the first and second decks continue recording when the record switch is operated.

Figure 13:
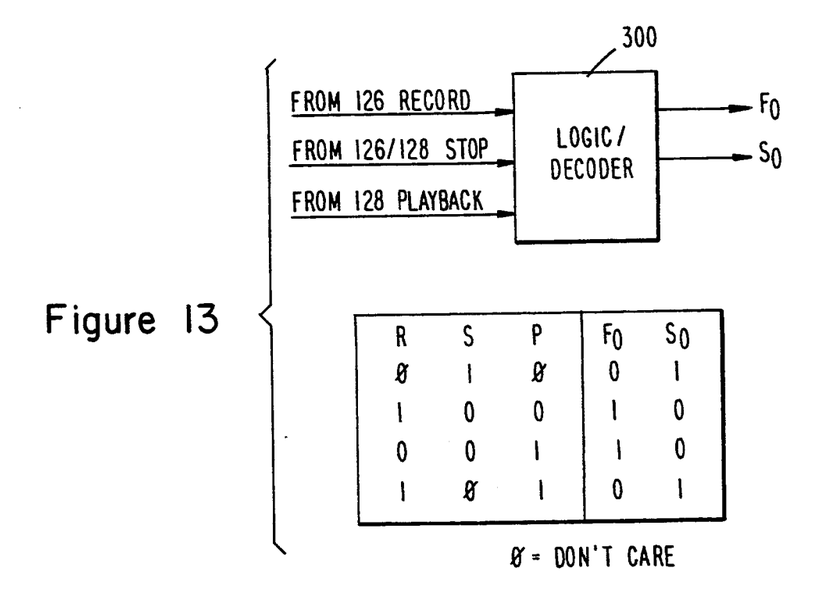
FIG. 13 is a diagram of override circuitry for preventing recording to the master deck when record and dubbing control switches are inadvertently operated simultaneously.

If the control panel 128 on the main unit 110 is operated to carry out dubbing, the master deck 30m plays back while all the other decks 30s record. If control panel 126 is operated to carry out a live recording, on the other hand, live programming from the microphone is recorded to all decks including the master. Since both the record and dubbing operation panels 126, 128 are accessible to the operator, it may happen that the operator will inadvertently operate switches of both panels when a master cassette is installed in deck 30m. Microphone signals would be recorded on the master cassette as well as on the slaves, a very serious problem as the master cassette will be corrupted or destroyed. To prevent unintentionally recording on the master, another aspect of the invention implements logic circuitry to force the master deck into a STOP condition if switches of panels 126 and 128 are operated simultaneously to command both recording and dubbing. Referring to FIG. 13, the main unit 110 includes a logic/decoder circuit 300 that receives control signals from the panels 126 and 128 of master unit 110 and supplies corresponding signals to drive the master deck 30m.

In the preferred embodiment of FIG. 13, logic/decoder 300 has input terminals receiving a RECORD signal from record panel 126, a PLAYBACK signal from dubbing panel 128 and a STOP signal from either panel. The logic circuit is configured to perform the function shown in the truth table of FIG. 13. That is, the circuit 300 will generate a STOP signal $S_0$ if a STOP command signal is received either from panel 126 or panel 128. A signal $F_0$ to drive the master deck forward is generated by the circuit 300 if either a RECORD command signal is received from panel 126 or a PLAYBACK command signal is received from panel 128. However, if both RECORD and PLAYBACK command signals are received from the record and dubbing control panels 126, 128, the circuit 300 generates a STOP signal $S_0$. The STOP signal will prevent the master deck from driving forward despite other control signals applied to it. As a result, it is impossible to record to the master deck while the same deck is operating in playback for dubbing.

Figure 15:
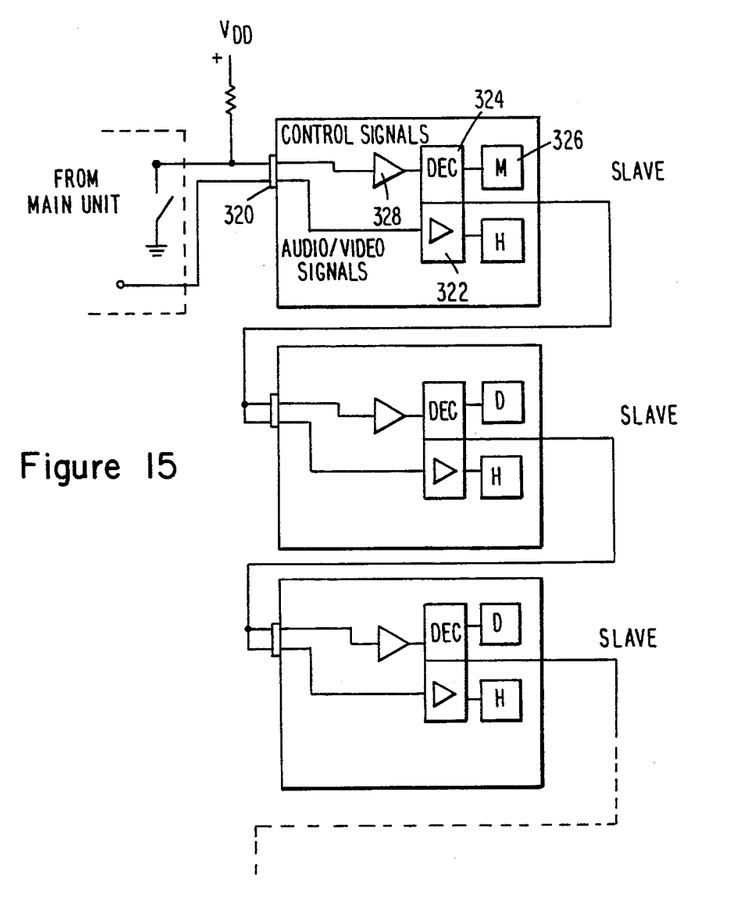
FIG. 15 is a block diagram of sub-units having amplification/signal conditioning of control signals received from a preceding unit.

Referring next to FIG. 15, control as well as audio signals derived from an external source or from the master deck are transferred to the slave decks 30s of sub-units 150 in series with each other. Preferably, the audio signals are amplified at the master to a degree sufficient to drive the recording heads of all the slave decks 30s. In FIG. 15, each slave deck 30s residing in the main unit and sub-units receive audio signals as well as drive control signals at terminals 320. The audio signals are supplied to the recording head H of each slave through an optional additional amplifier 322 that amplifies and conditions the audio signals to accommodate the electrical characteristics of the particular recording head used. Control signals are supplied to a decoder 324 that corresponds to circuit 200 of FIG. 11. These decoders 324 respond to control switches at the main unit 110 to operate a cassette deck drive motor 326 as required.

Figure 14A:
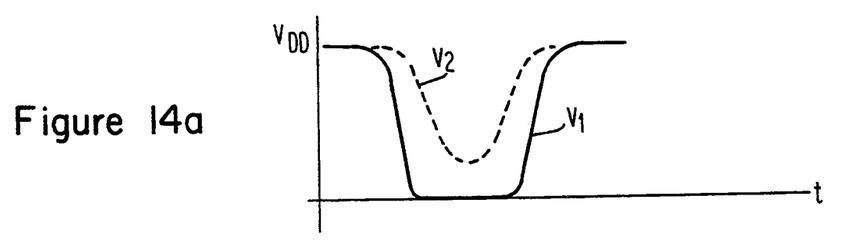
FIG. 14a depicts two control waveforms, one at a sub-unit near the main unit and the other at a sub-unit remote from the main unit.
Figure 14B:
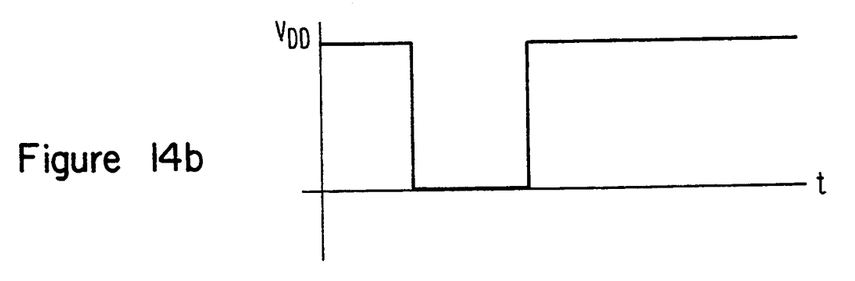
FIG. 14b shows a conditioned waveform applied to control circuitry in each sub-unit.

The control signals received by decoder 324 must transition through a voltage range of sufficient magnitude to ensure that the decoder will respond properly. The waveform $V_1$, shown in FIG. 14a, depicts the condition of the control signal at a location relatively near the main unit 110. It is characterized by relatively steep edges and a magnitude that changes between the values VDD and ground potential. However, at a sub-unit that is substantially displaced from the main unit, e.g., the 20th unit of the series, the control signal tends to degrade, as shown by $V_2$ of FIG. 14a.

As the signal degrades as a result of line capacitance and noise factors, the amplitude of the transition will tend to become reduced, and the edges become less steep. The decoder will occasionally not correctly interpret such a degraded signal, and one or more decks of a sub-unit will not be able to be controlled by the main unit. In accordance with a further aspect of the invention, associated with each slave deck is a signal amplifier/conditioner 328 that amplifies and conditions the control signal to have the form shown in FIG. 14b, with a full transition and steep edges, so that each decoder will reliably respond to commands. The amplifier/conditioner 328 also removes spurious components induced in the signal by distributed noise sources.

Whereas the preferred embodiment provides one signal amplifier/conditioner 328 for each slave deck, alternatively one amplifier/slave unit may drive one decoder for all decks of a sub-unit. As a further alternative, the circuits 328 may be distributed among sub-units only as required.

The system of this invention thus enables any number of tape copies to be made from a master tape or external source reliably and with insensitivity to operator error. The invention features circuitry for automatically bypassing the slave tape leaders during dubbing from a master, preventing inadvertent recording to the master when live recording and dubbing switches are operated simultaneously, and amplifying and conditioning control signals at each deck. The system furthermore provides time staggered recording to cassettes, a function not heretofore available.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

I claim:

1. A system for copying program signals from a master tape to a slave tape having a nonrecordable tape leader, comprising:
   master and slave drive units for master and slave tapes;
   a first head for reproducing program signals prerecorded on said master tape;
   a second head for recording program signals on said slave tape; and
   control means coupled to a control panel and said master and slave tape drive units and responsive to a panel selection of a dubbing mode of operation for energizing said master and slave drive units and controlling said first and second heads to copy program signals from said master tape to said slave tapes;
   wherein said control means includes a delay circuit coupled to said master drive unit and operative during said dubbing mode to delay energizing only said master drive unit following a start-up of said system for a duration sufficient to enable the nonrecordable tape leader of said slave tape to bypass said second head;
   further comprising multiple slave drive units operable simultaneously by said control means to make multiple copies of said master tape program signals; wherein
   (a) said master and slave drive units are incorporated in cassette decks, including a microphone input;

(b) said control means is responsive to a panel selection of a live performance recording mode of operation for recording live performance signals received through said microphone input onto cassettes in said multiple decks simultaneously;

(c) said control panel includes control switches to commonly control multiple slave decks;

(d) said control panel further includes means for generating a control signal in response to operation of a control switch;

(e) each slave deck includes a control signal conditioning circuit for amplifying and removing spurious components from said control signal; and (f) said master deck includes input terminals for receiving control signals from said control panel and output terminals for sending control signals to a slave deck, and each slave deck includes input terminals for receiving control signals from said master deck or another slave deck and output terminals for sending control signals to a slave deck.

2. The system of claim 1, wherein each deck includes a lid pivotable open and closed, and a pack switch responsive to said lid for controlling the corresponding drive unit independently of the others.

3. A system for copying program signals from a master tape to a slave tape having a nonrecordable tape leader, comprising:

master and slave drive units for master and slave tapes;

a first head for reproducing program signals prerecorded on said master tape;

a second head for recording program signals on said slave tape; and control means coupled to a control panel and said master and slave tape drive units and responsive to a panel selection of a dubbing mode of operation for energizing said master and slave drive units and controlling said first and second heads to copy program signals from said master tape to said slave tape;

wherein said control means includes a delay circuit coupled to said master drive unit and operative during said dubbing mode to delay energizing only said master drive unit following a start-up of said system for a duration sufficient to enable the nonrecordable tape leader of said slave tape to bypass said second head;

further comprising multiple slave drive units operable simultaneously by said control means to make multiple copies of said master tape program signals; wherein (a) said master and slave drive units are incorporated in cassette decks, including a microphone input;

(b) said control means is responsive to a panel selection of a live performance recording mode of operation for recording live performance signals received through said microphone input onto cassettes in said multiple decks simultaneously; and (e) said control panel includes a first bank of switches for controlling said system to operate in the dubbing mode and a second bank of switches for controlling said system to operate in the live performance recording mode, and override circuitry coupled to said first and second banks of switches to override one or the other when switches of both banks are operated simultaneously.

4. The system of claim 3, wherein, to prevent recording on the master tape, said override circuitry overrides the recording mode of operation when recording mode and dubbing mode panel switches are operated simultaneously.

5. A system for recording making multiple copies of program material derived from a live performance or a master cassette, comprising:

master and slave decks for master and slave cassettes;

a first head for reproducing program signals prerecorded on said master cassette;

second heads for recording program signals on each slave cassette; and control means coupled to a control panel and said master and slave decks and responsive (1) to a panel selection of a dubbing mode of operation for energizing said master and slave decks and controlling said first and second heads to reproduce on said slave cassettes program signals reproduced from said master cassette, and (2) to a panel selection of a live recording mode of operation for energizing said slave decks and controlling said second heads to record on said slave cassettes live program signals received from a microphone;

wherein said control panel includes a first bank of switches for controlling said system to operate in the dubbing mode, and a second bank of switches for controlling said system to operate in the live performance recording mode, and override circuitry coupled to said first and second banks of switches to override the recording mode of operation when recording mode and dubbing mode panel switches are operated simultaneously, so as to prevent recording on said master cassette.

6. The system of claim 5, wherein said second bank of switches commonly controls multiple slave cassette decks.

7. The system of claim 5, wherein said control panel includes means for generating a control signal in response to operation of a said switch, and wherein each slave deck includes a control signal conditioning circuit for amplifying and removing spurious components from said control signal.

8. The system of claim 5, wherein each deck includes a lid pivotable open and closed, and a pack switch responsive to said lid for controlling the corresponding drive unit independently of the others.

9. The system of claim 5, wherein said master deck includes an input terminal for receiving control signals from said control panel and an output terminal for sending control signals to a slave deck, and each slave deck includes an input terminal for receiving a control signal from said master deck or another slave deck and an output terminal for sending control signals to a slave deck.

10. The system of claim 5, wherein said cassettes each include a nonrecordable tape leader, and further wherein said control means includes delaying means operative during said dubbing mode to delay energizing said master drive unit following a start-up of said system for a duration sufficient to enable the nonrecordable tape leaders of said slaves to bypass said second heads.

11. A system for recording to multiple cassettes program material derived from a live performance or a master cassette, comprising:

master and slave decks for master and slave cassettes;

a first head for reproducing program signals prerecorded on said master cassette;

second heads for recording program signals to said slave cassettes;

a control panel having control means coupled to said master and slave decks and responsive (1) to a panel selection of a dubbing mode of operation for energizing said master and slave decks and controlling said first and second heads to reproduce on said slave cassettes program signals reproduced from said master cassette, and (2) to a panel selection of a live recording mode of operation for energizing said slave decks and controlling said second heads to record on said slave cassettes live program signals received from a microphone;

said control panel including a first bank of switches for controlling said system to operate in the dubbing mode and a second bank of switches for controlling said system to operate in the live performance recording mode; and override circuitry coupled to said first and second banks of switches to override the recording mode of operation when first and second banks of switches are operated simultaneously, so as to prevent recording on said master cassette;

each deck including a cassette lid pivotable open and closed, and a pack switch coupled to said lid for controlling the corresponding drive unit independently of the others.

12. The system of claim 11, wherein said cassettes each include a nonrecordable leader, and further wherein said control means includes delaying means operative during said dubbing mode to delay energizing said master drive unit following a start-up of said system for a duration sufficient to enable the nonrecordable leader portions of said slaves to bypass said second heads.

13. A system for copying program signals from a master tape to a slave tape having a nonrecordable tape leader, comprising:

master and slave drive units incorporated in cassette decks for master and slave tapes;

a first head for reproducing program signals prerecorded on said master tape;

a second head for recording program signals on said slave tape;

control means coupled to a control panel and said master and slave tape drive units and responsive to a panel selection of a dubbing mode of operation for energizing said master and slave drive units and controlling said first and second heads to copy program signals from said master tape to said slave tape;

multiple slave drive units being operable simultaneously by said control means to make multiple copies of said master tape program signals;

a microphone input, said control means being responsive to a panel selection of a recording mode of operation for recording live performance signals received through said microphone input onto said multiple tapes simultaneously;

wherein said control panel includes control switches to commonly control multiple slave decks, and means for generating a control signal in response to operation of a control switch;

said master cassette deck including an input terminal for receiving control signals from said control panel and an output terminal for sending control signals to a slave deck; and each slave deck including an input terminal for receiving a control signal from said master tape or another slave tape and an output terminal for sending control signals to a slave deck, and further including a control signal conditioning circuit for amplifying and removing spurious components from said control signal.

14. A system for copying program signals from a master tape to a slave tape having a nonrecordable tape leader, comprising:

master and slave drive units incorporated in cassette decks for master and slave tapes;

a first head for reproducing program signals prerecorded on said master tape;

a second head for recording program signals on said slave tape;

control means coupled to a control panel and said master and slave tape drive units and responsive to a panel selection of a dubbing mode of operation for energizing said master and slave drive units and controlling said first and second heads to copy program signals from said master tape to said slave tape;

wherein said control means includes delaying means operative during said dubbing mode to delay energizing said master drive unit following a start-up of said system for a duration sufficient to enable the nonrecordable tape leader of said slave to bypass said second head;

multiple slave drive units being operable simultaneously by said control means to make multiple copies of said master tape program signals;

a microphone input, said control means being responsive to a panel selection of a recording mode of operation for recording live performance signals received through said microphone input onto cassettes in said multiple decks simultaneously; and wherein said control panel includes a first bank of switches for controlling said system to operate in the dubbing mode and a second bank of switches for controlling said system to operate in the live performance recording mode, and override circuitry coupled to said first and second banks of switches to override one or the other when switches of both banks are operated simultaneously.

15. The system of claim 14, wherein, to prevent recording on the master tape, said override circuitry overrides the recording mode of operation when recording mode and dubbing mode panel switches are operated simultaneously.

* * * * *